United States Patent
Irie et al.

(10) Patent No.: US 8,058,330 B2
(45) Date of Patent: Nov. 15, 2011

(54) THREMOPLASTIC RESIN COMPOSITION AND PRODUCT THEREFROM

(75) Inventors: Masakazu Irie, Chiba (JP); Haruhiko Furukawa, Chiba (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 288 days.

(21) Appl. No.: 12/159,410

(22) PCT Filed: Dec. 21, 2006

(86) PCT No.: PCT/JP2006/326181
§ 371 (c)(1), (2), (4) Date: Jun. 27, 2008

(87) PCT Pub. No.: WO2007/077908
PCT Pub. Date: Jul. 12, 2007

(65) Prior Publication Data
US 2010/0222474 A1   Sep. 2, 2010

(30) Foreign Application Priority Data
Dec. 27, 2005 (JP) .................................. 2005-376226

(51) Int. Cl.
*C08K 5/34* (2006.01)
*C08K 5/3492* (2006.01)
*C08K 5/24* (2006.01)
*C08K 5/00* (2006.01)

(52) U.S. Cl. .......... 524/91; 524/100; 524/189; 524/261; 524/284

(58) Field of Classification Search ................ 524/91, 524/100, 189, 261, 284
See application file for complete search history.

(56) References Cited

U.S. PATENT DOCUMENTS

| | | | | |
|---|---|---|---|---|
| 3,192,181 A | * | 6/1965 | Moore | 528/15 |
| 3,992,355 A | * | 11/1976 | Itoh et al. | 524/862 |
| 4,803,244 A | | 2/1989 | Umbleby | |
| 5,900,446 A | * | 5/1999 | Nishihara et al. | 524/127 |
| 6,300,384 B1 | * | 10/2001 | Baba et al. | 521/54 |
| 2004/0014888 A1 | | 1/2004 | Fournier et al. | |

FOREIGN PATENT DOCUMENTS

| | | |
|---|---|---|
| EP | 0974617 A1 | 1/2000 |
| EP | 1164166 A1 | 12/2001 |
| JP | 2000109702 A | 4/2000 |

OTHER PUBLICATIONS

English language translation and abstract for JP 2000-109702 extracted from PAJ database, dated Jan. 27, 2009, 21 pages.
PCT International Search Report for PCT/JP2006/326181, dated Apr. 20, 2007, 4 pages.

* cited by examiner

*Primary Examiner* — Kriellion Sanders
(74) *Attorney, Agent, or Firm* — Howard & Howard Attorneys PLLC

(57) ABSTRACT

A thermoplastic resin composition comprising (A) a polyolefin-type thermoplastic elastomer or a similar thermoplastic resin, (B) an organopolysiloxane represented by the following average unit formula: $R^1_a SiO_{(4-a)/2}$ {where $R^1$ is a univalent hydrocarbon group having 1 to 10 carbon atoms, and "a" is a number in the range of 1.95 to 2.05}, and (C) a metal deactivator; and a product molded from the aforementioned composition. The thermoplastic resin composition is suitable for obtaining molded products that are characterized by their ability to suppress development of defects on the product surfaces after long-term outdoor exposure.

9 Claims, No Drawings

THREMOPLASTIC RESIN COMPOSITION AND PRODUCT THEREFROM

RELATED APPLICATIONS

This application claims priority to and all the advantages of International Patent Application No. PCT/JP2006/326181, filed on Dec. 21, 2006, which claims priority to Japanese Patent Application No. JP2005-376226, filed on Dec. 27, 2005.

TECHNICAL FIELD

The present invention relates to a thermoplastic resin composition and to a product molded from this composition. More specifically, the invention relates to a thermoplastic resin composition that contains an organopolysiloxane and that is suitable for molding products in which development of external surface defects is suppressed, even after long-term outdoor exposure.

BACKGROUND ART

One advantage of thermoplastic resins used in the manufacture of automobile interior and exterior parts, as well as external parts of domestic appliances, is that the parts made from these resins are suitable for recycling. However, thermoplastic resins of the aforementioned type, especially thermoplastic elastomers, have low surface lubricating properties, low abrasion resistance, and have surfaces that can be easily damaged. It has been proposed to solve the above problems by compounding thermoplastic elastomers with organopolysiloxanes. For example, Japanese Unexamined Patent Application Publication (Kokai) 2000-109702 discloses an abrasion-resistant thermoplastic resin composition comprising an olefin-type thermoplastic elastomer compounded with silicone oil and/or a silicone resin and a silicone powder.

DISCLOSURE OF INVENTION

However, the inventors have found that after long-term outdoor use, products molded from thermoplastic resin compositions admixed with organopolysiloxanes develop external defects such as whitening on the outer surfaces caused by migration of the organopolysiloxanes to the surfaces of the molded products.

It is an object of the present invention to provide a thermoplastic resin composition that combines sufficient surface-lubricating properties with an ability of forming molded product in which development of external defects is suppressed.

The present invention provides a thermoplastic resin composition comprising (A) a thermoplastic resin, (B) an organopolysiloxane, and (C) a metal deactivator.

It is recommended that aforementioned component (A) be a polyolefin-type thermoplastic elastomer.

It is recommended that aforementioned component (B) comprises an organopolysiloxane that has kinematic viscosity of equal to or more than 100,000 mm$^2$/sec at 25° C. and is represented by the following average unit formula: $R^1{}_a Si O_{(4-a)/2}$ {where $R^1$ is a univalent hydrocarbon group having 1 to 10 carbon atoms, and "a" is a number in the range of 1.95 to 2.05}. It is preferable to add component (B) in an amount of 0.1 to 50 parts by mass per 100 parts by mass of component (A).

It is recommended that aforementioned component (C) is a hydrazide derivative. It is preferable to add component (C) in an amount of 0.05 to 10 parts by mass per 100 parts by mass of the sum of components (A) and (B).

Since the thermoplastic resin composition of the present invention is composed of (A) a thermoplastic resin, (B) an organopolysiloxane, and (C) a metal deactivator, a product molded from this composition is characterized by excellent surface lubricating properties and has the ability of suppressing the development of external surface defects, even after long-term outdoor exposure.

BEST MODE FOR CARRYING OUT THE INVENTION

Component (A) is one of the main components of the thermoplastic resin composition of the present invention. There are no special restrictions with regard to the types of the thermoplastic resin of component (A), provided that this is an organic resin which is solid at room temperature and can be plastically deformed when heated. Component (A) may comprise a thermoplastic resin of one type or a mixture of thermoplastic resins of two or more types.

The following are examples of appropriate thermoplastic resins of component (A): polyethylene (PE) resin, low-density polyethylene (LDPE) resin, high-density polyethylene resin, ultra-high-molecular-weight polyethylene (UHMPE) resin, polypropylene (PP) resin, polymethyl pentene (MPX) resin, a copolymer of ethylene and methacrylic acid ester, a copolymer of ethylene and vinyl acetate (EVA), or similar polyolefin-type resins; polymethylmethacrylate (PMMA) resin, or similar acrylic-type vinyl resins; polystyrene (PS) resin, high impact resistance polystyrene (HIPS) resin, a copolymer of acrylonitrile, butadiene, and styrene (ABS) resin, a copolymer of acrylonitrile and styrene (AS) resin, a copolymer of acrylonitrile, acrylic rubber, and styrene (AAS), a copolymer of acrylonitrile, ethylene-propylene rubber, and styrene (AES), or similar styrene-type vinyl resins; polyvinylacetate resin, polyvinylchloride (PVC) resin, polyvinylidene chloride (PVDC) resin, polyvinyl alcohol resin (PVA), polytetrafluoroethylene resin (PTFE), or similar vinyl-type resins; polybutylene terephthalate (PBT) resin, polyethylene terephthalate (PET) resin, or similar polyester resins; Nylon 6, Nylon 66, Nylon 610, Nylon 11, Nylon 12, or similar polyamide resins; polyacetal (POM) resin, or similar polyoxyalkylene resins; polycarbonate (PC) resin, modified polyphenylene ether (modified PPE) resin, polyvinyl acetate (PVAC) resin, polysulfone (SU) resin, polyether sulfone (PES) resin, polyphenylene sulfide (PPS) resin, polyarylate (PAR) resin, polyamide-imide (PAR) resin, polyether-imide (PEI) resin, polyether-ether-ketone (PEEK) resin, polyimide (PI) resin, liquid-crystal polyester (LCP) resin, or copolymers of the aforementioned resins.

Thermoplastic resins that are known as thermoplastic elastomers can be exemplified by polyolefin-type thermoplastic elastomers, polystyrene-type thermoplastic elastomers, polyamide-type thermoplastic elastomers, polyester-type thermoplastic elastomers, polyvinylchloride-type thermoplastic elastomers, polyurethane-type thermoplastic elastomers, and fluoro-polymer-type thermoplastic elastomers.

Among the above, elastomers suitable for use from viewpoints of ease of molding and softness of the molded products are polyolefin-type type thermoplastic elastomers and polystyrene-type thermoplastic elastomers, especially, polyolefin-type thermoplastic elastomers.

Polyolefin-type thermoplastic elastomers can be exemplified by a dynamically cross-linked polyolefin-type thermoplastic elastomer comprising polyethylene or polypropylene as a hard phase and dynamically cross-linked EPDM, EPR, or butyl rubbers with peroxides or other cross-linking agent as a soft-phase. The aforementioned polyolefin-type thermoplastic elastomers are commercially produced, e.g., by AES [Advanced Elastomer Systems] Japan under trademark "SANTPRENE". This polyolefin-type thermoplastic elastomer with dynamically cross-linked soft layers is suitable for use as a main component of the thermoplastic resin composition of the present invention that makes it possible to manufacture molded products with excellent resistance to heat, weatherproof properties, and improved mechanical characteristics.

Other polyolefin-type thermoplastic elastomers can be exemplified by a polymer blend-type or polymer alloy-type thermoplastic elastomers comprising polyethylene or polypropylenes as a hard phase and EPDM, EPR, or butyl rubbers as soft phase. Such polyolefin-type thermoplastic elastomers are commercially produced, e.g., by Mitsui Chemicals Co., Ltd. under trademarks "MILASTOMER", and "GOODMER".

Polystyrene-type thermoplastic elastomers can be exemplified by a block-copolymer-type thermoplastic elastomer comprising polystyrenes as a hard phase, and polybutadienes, polyisobutylene, or hydrogenated polybutadienes as a soft phase. The aforementioned polystyrene-type thermoplastic elastomers are commercially produced by Asahi Kasei Co., Ltd. under trademarks "TUFTEK", "TUFPRENE", "SORPRENE" and "ASAPRENE". The polystyrene-type thermoplastic elastomers which comprise a soft phase dynamically cross-linked by using peroxides or other cross-linking agents are commercially produced by Riken Technos Corporation under trademark "ACTYMER".

In the present invention, the organopolysiloxane of component (B) is used for imparting lubricating and damage-resistant properties to the surface of a product molded from the composition of the invention. The preferable organopolysiloxane (B) is represented by the following average unit formula: $R^1_a SiO_{(4-a)/2}$, where $R^1$ is a substituted or unsubstituted univalent hydrocarbon group having 1 to 10 carbon atoms, and "a" is a number in the range of 1.95 to 2.05. In this formula, $R^1$ is a univalent hydrocarbon group, such as a methyl, ethyl, propyl, or a similar alkyl group; a vinyl, propenyl, butenyl, hexenyl or a similar alkenyl group; a phenyl, or a similar aryl group. Among these, most preferable are alkyl groups, especially methyl groups. Component (B) may have a small amount of hydroxyl groups on molecular terminals. It is preferable that component (B) does not contain hydrolyzable reactive groups, such as silazane, as well as methoxy, ethoxy, or similar alkoxy groups. This is because the presence of hydrolyzable reactive groups in component (B) will either impair storage stability of the composition, or will destabilize lubricating properties on the surface of a molded product.

The organopolysiloxane (B) may have a linear, partially-branched linear, or net-like molecular structure, of which the linear or partially-branched linear molecular structure is preferable. Specific examples of component (B) are the following: a dimethylpolysiloxane capped with trimethylsiloxy groups, a copolymer of methylvinylsiloxane and dimethylsiloxane capped with trimethylsiloxy groups, a copolymer of methylphenylsiloxane and dimethylsiloxane capped with trimethylsiloxy groups, dimethylpolysiloxane capped with silanol groups, a copolymer of methylvinylsiloxane and dimethylsiloxane capped with silanol groups, and a copolymer of methylphenylsiloxane and dimethylsiloxane capped with silanol groups.

There are no special limitations with regard to kinematic viscosity of organopolysiloxane (B), but from the viewpoint of better handling properties, improved surface lubricating properties and resistance to surface damage, it is recommended that the kinematic viscosity at 25° C. be equal to or higher than 100,000 mm$^2$/sec. It is more preferable that the kinematic viscosity of organopolysiloxane (B) at 25° C. exceed 500,000 mm$^2$/sec, and even more preferable that the kinematic viscosity of organopolysiloxane (B) at 25° C. exceed 1,000,000 mm$^2$/sec when this component acquires a semi-solid (gumm) state.

Component (B) is added in an amount of 1 to 50 parts by mass, preferably 0.5 to 20 parts by mass per 100 parts by mass of component (A). If component (B) is added in an amount of less than the lower recommended limit of the above range, it will be impossible to provide the surface of a product molded from the composition of the invention with sufficient lubricating properties, and if the content of component (B) exceeds the upper recommended limit, the composition will become too viscous and difficult for pelletizing and handling.

The metal deactivator of component (C) is intended for protecting the molded products from development of external defects, such as whitening, that may appear on the surfaces of products molded from the thermoplastic resin compositions of the invention after long-term outdoor exposure. The mechanism that develops the aforementioned external defects is not yet well determined, but taking into account the fact that in thermoplastic compositions which do not contain component (B) such external defects do not develop, it can be assumed that deterioration of component (B) that migrates to the surface of the molded product occurs and progresses under the effect of heavy metals such as tin or titanium that are contained in component (A) in microscopic quantities as polymerization catalysts or cross-linking agents.

Component (C) can be exemplified by hydrazide derivatives, oxalic acid derivatives, triazole derivatives, triazine derivatives, or other known compounds which are commercially produced, e.g., by Chiba Specialty Chemicals Co., Ltd. and Adeka Kogyo Co., Ltd. The following are specific examples of component (C): N,N'-disalicyloyl hydrazine, decamethylenedicarboxylate-disalicyloyl hydrazide, N,N'-bis[3-(3,5-di-t-butyl-4-hydroxyphenyl) propionyl]hydrazine or a similar hydrazide derivatives; benzotriazol, 3-amino-1, 2,4-triazol, 3-amino-5-methyl-1,2,4-triazol, 3-amino-1,2,4-triazol-carboxylate, 3-(N-salicyloyl) amino-1,2,4-triazol, 3-(N-salicyloyl) amino-5-methyl-1,2,4-triazol, or a similar toriazol derivatives; 2,4,6-triamino-1,3,5-triazine or a similar triazine derivatives; and 2,2'-oxamido-bis-[ethyl-3-(3,5-di-t-butyl-4-hydroxyphenyl) propionate. Among these, a hydrazide derivative, a triazole derivatives and a triazine derivatives are preferable, the hydrazide derivative is even more preferable and, in particular, the N,N'-bis[3-(3,5-di-t-butyl-4-hydroxyphenyl)propionyl]hydrazine, which is commercially produced by Chiba Specialty Chemicals under trademark "Irganox MD-1024" is especially preferable.

The metal deactivator of component (C) should be added in an amount of 0.05 to 10 parts by mass, preferably 0.1 to 4 parts by mass, and most preferably, 0.2 to 2 parts by mass per 100 parts by mass of the sum of components (A) and (B). If component (C) is used in an amount of less than the recommended lower limit, it will be difficult to limit the development of defects on the surfaces of the molded products after long-term outdoor exposure. If, on the other hand, component (C) is used in an amount exceeding the recommended upper limit, this will either decrease mechanical characteristics of the composition, or will cause component (C) to bloom out to the surface. Component (C) can be used as a single compound or as a mixture of two or more compounds.

The thermoplastic resin composition of the invention is prepared from aforementioned components (A) through (C), but, if necessary, the composition may also be combined with a hindered phenol, hindered amine, or a similar antioxidant in an amount of 0.1 to 5 parts by mass, preferably, 0.1 to 2 parts by mass per 100 parts by mass of the composition. Furthermore, the composition may also be compounded with a bisphenol-A or a similar epoxy resin used in an amount of 0.1 to 5, parts by mass preferably 0.2 to 3 parts by mass per 100 parts by mass of the composition. An appropriate epoxy resin should be used when the effect of other additives, such as antioxidants, is reduced because of absorption by inorganic additives.

Furthermore, within the limits that do not impair flowability and mechanical strength, the composition may be combined with other additives such as fillers, e.g., calcium carbonate, calcium silicate, clay, kaolin, talc, silica, diatomaceous earth, mica, asbestos, alumina, barium sulfite, aluminum sulfate, calcium sulfate, basic magnesium carbonate, molybdenum disulfide, graphite, carbon black, carbon fibers, silicone rubber powder, silicone resin powder, etc. Within the limits not contradicting the objects of the present invention, the composition can be compounded with other conventional additives normally added to thermoplastic elastomer compositions. Such additives can be exemplified by ultraviolet-ray absorbants, light-resistant agents, heat stabilizer, plasticizers, foaming agents, crystal nucleating agents, lubricants, charge removing agents, conductivity imparting agents, pigments, dyes, solubilizing agents, cross-linking agents, flame retarders, fungicde, shrinkage reducing agent, thickeners, mold-release agents, antifogging agents, blue-ink agents, silane-coupling agents, etc.

The composition of the invention is easily prepared by combining components (A) through (C) in appropriate proportions, melting the mixture by heating, and uniformly mixing the molten mass. If necessary, a master batch can be first prepared by combining and hot-melting 10 to 150 parts by mass of component (B), 0.1 to 50 parts by mass of component (C) and 100 parts of component (A), and then adding and hot-molten the master batch, composed of components (A), (B) and (C), to component (A) in proportions required for the final composition. Alternatively, the master batch can be prepared by combining and hot-melting 10 to 150 parts by mass of component (B) and 100 parts of component (A), and then adding and hot-molten the master batch, composed of components (A) and (B), to component (A) and (C) in proportions required for the final composition. There are no special restrictions with regard to the equipment suitable for the preparation of the composition of the invention. This equipment may comprise, e.g., a Banbury mixer, kneader mixer, two-roll mill, or a continuous-action kneader-extruder.

The composition is suitable for molding by various conventional methods, such as injection molding, extrusion, and compression molding.

Application Examples 1 to 5

A thermoplastic resin, organopolysiloxane, and a metal deactivator were compounded in proportions shown in Table 1 and mixed with heating at 200° C. by means of Labo Plastomill operating at 100 rpm. After the mixture was cooled, a solid thermoplastic resin composition was obtained. The composition was reheated to 200° C. in a hot press and formed into a flat plate having dimensions of 100 mm×200 mm×2 mm. The plate was subjected to accelerated weatherproof tests by irradiation with light during 2000 hours in a Xenon weather meter (black panel temperature: 63° C.; rainy conditions). Values of L, a*, and b* were measured prior to and after the test with the use of a color difference meter, and $\Delta E$ was calculated. The results are shown in Table 1.

Comparative Example 1

A thermoplastic resin and organopolysiloxane were compounded in proportions shown in Table 1 and mixed with heating at 200° C. by means of Labo Plastomill operating at 100 rpm. After the mixture was cooled, a solid thermoplastic resin composition was obtained. The composition was reheated to 200° C. in a hot press and formed into a flat plate having dimensions of 100 mm×200 mm×2 mm. The plate was subjected to accelerated weather-proof tests by irradiation with light during 2000 hours in a Xenon weather meter (black panel temperature: 63° C.; rainy conditions). Values of L, a*, and b* were measured prior to and after the test with the use of a color difference meter, and $\Delta E$ was calculated. The results are shown in Table 1.

Color was measured with the use of spectrocolorimeter of Minolta Camera Co., Ltd. (Model No. CM2002). L axis was used for defining brightness, a* axis was used for defining red/green direction, and b* axis was used for defining yellow/blue direction. L axis is in the range of 0 (black) to 100 (white). The positive direction on a* axis corresponded to red; the negative direction on a* axis corresponded to green; the positive direction on b* axis corresponded to yellow; the negative direction on b*axis corresponded to blue. Color difference was calculated using the following formulae.

$$\Delta E = \sqrt{(\Delta L)^2 + (\Delta a)^2 + (\Delta b)^2}$$

$$\Delta L = L(2) - L(1)$$

$$\Delta a = a^*(2) - a^*(1)$$

$$\Delta b = b^*(2) - b^*(1)$$

a*(1), b*(1), and L(1): the color of a flat plate prepared from a thermoplastic resin composition.

a*(2), b*(2), and L(2): the color of a flat plate prepared from a thermoplastic resin composition which had been subjected to accelerated weather-proof tests by irradiation with light during 2000 hours in a Xenon weather meter (black panel temperature: 63° C.; rainy conditions).

TABLE 1

|  | Application Examples | | | | | Comp. Ex. |
| --- | --- | --- | --- | --- | --- | --- |
|  | 1 | 2 | 3 | 4 | 5 | 1 |
| (A) Thermoplastic Resin*[1] (parts by mass) | 100 | 100 | 100 | 100 | 100 | 100 |
| (B) Organopolysiloxane*[2] (parts by mass) | 5 | 5 | 5 | 5 | 5 | 5 |
| Component (C) | | | | | | |
| Metal deactivator*[3] (parts by mass) | 0.1 | 0.5 | | | | |
| Metal deactivator*[4] (parts by mass) | | | 0.5 | | | |
| Metal deactivator*[5] (parts by mass) | | | | 0.5 | | |
| Metal deactivator*[6] (parts by mass) | | | | | 0.5 | |

TABLE 1-continued

|  | Application Examples | | | | | Comp. Ex. |
|---|---|---|---|---|---|---|
|  | 1 | 2 | 3 | 4 | 5 | 1 |
| Initial Color Hues | | | | | | |
| L(1) | 23.26 | 22.91 | 22.03 | 21.53 | 21.9 | 21.34 |
| a*(1) | 0.45 | 0.47 | 0.53 | 0.44 | 0.6 | 0.63 |
| b*(1) | −0.53 | −0.47 | −0.52 | −0.32 | −0.45 | −0.38 |
| Color Hues after Weather-Proof Test | | | | | | |
| L | 24.41 | 23.94 | 25.27 | 26.79 | 25.52 | 31.70 |
| a*(2) | 0.43 | 0.44 | 0.37 | 0.4 | 0.34 | 0.40 |
| b*(2) | −0.31 | −0.45 | 0.1 | 0.22 | 0.04 | 0.72 |
| Color Difference ΔE | 1.2 | 1.0 | 3.3 | 5.3 | 3.7 | 10.4 |

*[1]olefin-type thermoplastic elastomer Trademark: Santoprene 121-62M 100 (AES Japan Co., Ltd.)
*[2]Trademark: BY16-140 Polydimethylsiloxane capped at both molecular terminals with dimethylhydroxysilyl groups; kinematic viscosity higher than 16,000,000 mm$^2$/sec, polystyrene-recalculated number-average molecular weight determined by gel permeation chromatography: 350,000 (Dow Corning Toray Co., Ltd.)
*[3]Trademark: Irganox MD-1024 N,N'-bis [3-(3,5-di-t-butyl-4-hydroxyphenyl) propionyl] hydrazine (Chiba Specialty Chemicals Co., ltd.)
*[4]Trademark: Adeka Stab CDA-1 3-(N-salicyloyl) amino-1,2,4-triazol (Adeka Kogyo Co., Ltd.)
*[5]Trademark: Adeka Stab CDA-6 Disalicyloyl hydrazide of decamethylene dicarboxylic acid (Adeka Kogyo Co., Ltd.)
*[6]Trademark: Adeka Stab ZS-27 A mixture with the main component in the form of 2,4,6-triamino-1,3,5-triazine (Adeka Kogyo Co., Ltd.)

Industrial Applicability

Since the composition of the invention possesses excellent moldability and since the product molded from the composition possesses excellent surfaces lubrication property, abrasion resistance, and weather resistance, the composition can be used for manufacturing applications in appropriate fields required such properties, e.g., door trimmers, console panels, instrumental panels, weather strips, or other interior and exterior parts of a vehicle, as well as for manufacturing external parts of glass sash window frames, gaskets, packings, or other construction materials, outer casings of electric domestic appliances.

The invention claimed is:

1. A thermoplastic resin composition comprising (A) a thermoplastic resin, (B) an organopolysiloxane added in an amount of 0.1 to 50 parts by mass per 100 parts by mass of component (A), and represented by the following average unit formula: $R^1_a SiO_{(4-a)/2}$, where $R^1$ is a univalent hydrocarbon group having 1 to 10 carbon atoms, and "a" is a number in the range of 1.95 to 2.05, and (C) a metal deactivator selected from the group consisting of a hydrazide derivative, an oxalic acid derivative, a triazole derivative, and a triazine derivative, and added in an amount of 0.05 to 10 parts by mass per 100 parts by mass of the sum of components (A) and (B).

2. The thermoplastic resin composition of claim 1, wherein said component (A) is a polyolefin-type thermoplastic elastomer.

3. The thermoplastic resin composition of claim 1, wherein said organopolysiloxane of component (B) has a kinematic viscosity of equal to or more than 100,000 mm$^2$/sec at 25° C.

4. The thermoplastic resin composition of claim 1, wherein said component (C) is selected from the group consisting of a hydrazide derivative, a triazole derivative, and a triazine derivative.

5. The thermoplastic resin composition of claim 1, wherein said component (C) is a hydrazide derivative.

6. A product molded from the thermoplastic resin composition according to claim 1.

7. The thermoplastic resin composition of claim 3, wherein said component (C) is selected from the group consisting of a hydrazide derivative, a triazole derivative, and a triazine derivative.

8. The thermoplastic resin composition of claim 1, wherein said component (C) is a triazole derivative.

9. The thermoplastic resin composition of claim 1, wherein said component (C) is a triazine derivative.

* * * * *